(12) United States Patent
Su et al.

(10) Patent No.: US 10,003,770 B2
(45) Date of Patent: Jun. 19, 2018

(54) METHOD FOR MULTI-PICTURE CONTROL IN VIDEO CONFERENCE, RELATED DEVICE, AND STORAGE MEDIUM

(71) Applicant: ZTE Corporation, Shenzhen (CN)

(72) Inventors: Dafeng Su, Shenzhen (CN); Rong Shi, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days. days.

(21) Appl. No.: 15/116,367

(22) PCT Filed: Aug. 20, 2014

(86) PCT No.: PCT/CN2014/084827
§ 371 (c)(1),
(2) Date: Aug. 3, 2016

(87) PCT Pub. No.: WO2015/131499
PCT Pub. Date: Sep. 11, 2015

(65) Prior Publication Data
US 2016/0353060 A1    Dec. 1, 2016

(30) Foreign Application Priority Data

Mar. 5, 2014    (CN) .......................... 2014 1 0077644

(51) Int. Cl.
*H04N 7/14*    (2006.01)
*H04N 7/15*    (2006.01)

(52) U.S. Cl.
CPC .................................. *H04N 7/152* (2013.01)

(58) Field of Classification Search
USPC ............................. 348/14.01–14.09; 370/352
See application file for complete search history.

(56) References Cited

U.S. PATENT DOCUMENTS

| 2007/0206089 A1* | 9/2007 | Eshkoli ............... H04L 12/1822 |
| | | 348/14.02 |
| 2009/0116563 A1* | 5/2009 | Kawamura ........... H04N 5/265 |
| | | 375/240.26 |
| 2011/0069143 A1 | 3/2011 | Beers |

FOREIGN PATENT DOCUMENTS

| CN | 101047532 A | 10/2007 |
| CN | 101141616 A | 3/2008 |
| CN | 101198008 A | 6/2008 |

(Continued)

OTHER PUBLICATIONS

International Search Report in international application No. PCT/CN2014/084827, dated Dec. 17, 2014.

(Continued)

*Primary Examiner* — Maria El-Zoobi
(74) *Attorney, Agent, or Firm* — Oppedahl Patent Law Firm LLC

(57) ABSTRACT

Disclosed are a method for multi-picture control in a video conference, a related device, and a storage medium. An MCU supports a multi-site video conference; and in the method, the process executed by the MCU comprises: when a conference is initially started, the MCU sending unified conference site picture information to a video terminal in each conference site; and during the conference, the MCU sending corresponding customized conference site picture information to some video terminals according to conference site picture customization requests of the video terminals.

11 Claims, 5 Drawing Sheets

(56) References Cited

FOREIGN PATENT DOCUMENTS

| | | | |
|---|---|---|---|
| CN | 101729849 | A | 6/2010 |
| CN | 102263930 | A | 11/2011 |
| CN | 102523572 | A | 6/2012 |
| EP | 2019557 | A1 | 1/2009 |
| EP | 2209312 | A1 | 7/2010 |
| WO | 2009136905 | A1 | 11/2009 |

OTHER PUBLICATIONS

English Translation of the Written Opinion of the International Search Authority in international application No. PCT/CN2014/084827, dated Dec. 17, 2014.

Supplementary European Search Report in European application No. 14884695.9, dated Jan. 13, 2017.

\* cited by examiner

METHOD FOR MULTI-PICTURE CONTROL IN VIDEO CONFERENCE, RELATED DEVICE, AND STORAGE MEDIUM

TECHNICAL FIELD

The disclosure relates to the technical field of video conferences, and particularly to a method for managing and controlling a multi-picture in a video conference, a related device, and a storage medium.

BACKGROUND

A Universal Port (UP), which is a port-based design technology applied to a Multi Control Unit (MCU), implements a function of viewing different multi-pictures at various conference sites on the premise of improving the media processing capability of the MCU, so as to satisfy individualized requirements of different conference sites.

Generally, there are two or more conference sites in a video conference. In multi-picture technology, the MCU combines pictures of a plurality of conference sites into one picture and sends the picture to each of video terminals of the conference sites. The principles of the multi-picture technology are as follows: the MCU decodes pictures of different video formats, bandwidths and protocols from different conference sites by using the coding and decoding capabilities of a chip of the MCU, and then combines and codes the pictures as required by a user and sends the pictures to each of video terminals of the conference sites. In this way, pictures of a plurality of conference sites may be viewed in a picture displayed by video terminals of one conference site.

At present, MCU resources are limited, and a conventional method is that the same multi-picture is viewed at all conference sites, thereby saving MCU decoding resources. An UP idea is proposed as the MCU processing capability is improved, thus a different multi-picture may be freely selected to be viewed at any conference site as required by the conference site. In such case, however, many resources need to be consumed.

SUMMARY

The technical problem to be solved by embodiments of the disclosure is to provide a method for managing and controlling a multi-picture in a video conference, a related device, and a storage medium which can satisfy a requirement of each of video terminals of conference sites on a video picture while improving the use efficiency of coding and decoding resources on the MCU.

In a first aspect, an embodiment of the disclosure provides a method for managing and controlling a multi-picture in a video conference. An MCU supports a multi-site video conference, and the method may include processes, executed by the MCU, of:

when the conference is initially started, the MCU sends unified conference site picture information to each of video terminals of conference sites; and during the conference, the MCU sends corresponding customized conference site picture information to at least one of the video terminals according to a request for a customized conference site picture of the at least one of the video terminals.

Alternatively, the at least one of the video terminals may be selected by:

selecting eligible video terminals from video terminals sending requests for a customized conference site pictures as the selected at least one of the video terminals, through a method for setting authority statically, a method for setting authority semi-dynamically, or a method for setting authority dynamically.

Alternatively, in the case of the method for setting authority statically, the process executed by the MCU may further include that:

before the conference is started, identification information of video terminals having advanced authorities is configured on the MCU, while coding and decoding resources on the MCU for the multi-site video conference are applied for and corresponding coding and decoding resources on the MCU are allocated to each of the video terminals having advanced authorities, wherein the allocated coding and decoding resources on the MCU can support display of picture information of all conference sites on the video terminals.

Alternatively, the process that during the conference, the MCU sends corresponding customized conference site picture information for display to the at least one of the video terminals according to the request for the customized conference site picture of the at least one of the video terminals may include that:

when receiving a request for a customized conference site picture sent by any video terminal, the MCU judges, based on the configured identification information of the video terminals having the advanced authorities, whether the video terminal sending the request has an advanced authority, and if the video terminal sending the request has the advanced authority, acquires customization parameters from the video terminal, and if the video terminal sending the request has not the advanced authority, terminates the process; and the MCU combines, based on the acquired customization parameters and coding and decoding resources on the MCU allocated to the video terminal, a multi-picture so as to acquire customized conference site picture information, and sends the customized conference site picture information to the video terminal for display.

Alternatively, in the case of the method for setting authority semi-dynamically, the process executed by the MCU may further include that: before the conference is started, the number of video terminals having advanced authorities is configured on the MCU while coding and decoding resources on the MCU for the multi-site video conference are applied for and a corresponding number of coding and decoding resources on the MCU are allocated based on the configured number of the video terminals having the advanced authorities, wherein the allocated coding and decoding resources on the MCU can support display of picture information of all conference sites on the video terminals having the advanced authorities.

Alternatively, the process that during the conference, the MCU sends corresponding customized conference site picture information for display to the at least one of the video terminals according to the request for the customized conference site picture of the at least one of the video terminals may include that:

when receiving a request for a customized conference site picture sent by any video terminal, the MCU judges whether the coding and decoding resources on the MCU allocated to the video terminals having the advanced authorities are used up, if the coding and decoding resources on the MCU allocated to the video terminals having the advanced authorities are used up, terminates the process, and if the coding and decoding resources on the MCU allocated to the video terminals having the advanced authorities are not used up, acquires customization parameters from the video terminal; and the MCU combines, based on the acquired customization parameters and remaining coding and decoding resources on the MCU, a multi-picture so as to acquire customized conference site picture information, and sends the customized conference site picture information to the video terminal for display.

Alternatively, in the case of the method for setting authority dynamically, the MCU supports at least two multi-site video conferences, and the process that during the conference, the MCU sends the corresponding customized conference site picture information for display to the at least one of the video terminals according to the request for the customized conference site picture of the at least one of the video terminals may specifically include that:

when receiving a request for a customized conference site picture sent by any video terminal, the MCU judges whether there are sufficient available coding and decoding resources on the MCU, if there are sufficient available coding and decoding resources on the MCU, acquires customization parameters from the video terminal, and if there are not sufficient available coding and decoding resources on the MCU, terminates the process; and the MCU combines, based on the customization parameters and the available coding and decoding resources on the MCU, a multi-picture so as to acquire customized conference site picture information, and sends the customized conference site picture information to the video terminal for display.

Alternatively, the process executed by the MCU may further include that: before the conference is started, authentication information of a video terminal having an advanced authority is configured on the MCU, and after it is identified based on the authentication information that the video terminal has the advanced authority, customization parameters are acquired from the video terminal.

Alternatively, the method may includes processes executed by a video terminal that:

when the conference is initially started, the unified conference site picture information sent by the MCU is displayed;

during the conference, a request for a customized conference site picture is sent to the MCU as required; and received customized conference site picture information is displayed.

Alternatively, the process executed by the video terminal may further include that:

when the MUC acquires customization parameters from the video terminal, the customization parameters are sent to the MCU.

Alternatively, the customization parameters may include: the number and layouts of conference site pictures, and a video source of a selected conference site picture.

Alternatively, the request for a customized conference site picture may contain identification information of the video terminal, and the identification information may be used by the MCU to judge whether the corresponding video terminal has an advanced authority.

Alternatively, the process executed by the video terminal may further include that:

after the request for a customized conference site picture is sent to the MCU, authentication information of the video terminal is sent to the MCU, wherein the authentication information is used by the MCU to identify whether the video terminal has the advanced authority.

In a second aspect, an embodiment of the disclosure further provides an MCU for implementing management and control of a multi-picture in a video conference. The MCU supports a multi-site video conference and includes:

an initial processing module configured to send unified conference site picture information to each of video terminals of conference sites when the conference is initially started; and a management and control processing module configured to send corresponding customized conference site picture information to at least one of the video terminals according to a request for a customized conference site picture of the at least one of the video terminals during the conference.

Alternatively, the at least one of the video terminals may be selected by: selecting eligible video terminals from video terminals sending requests for customized conference site pictures as the selected at least one of the video terminals, through a method for setting authority statically, a method for setting authority semi-dynamically; or a method for setting authority dynamically.

Alternatively, in the case of the method for setting authority statically, the MCU may further include:

an initial configuring module configured to, before the conference is started, configure; on the MCU, identification information of video terminals having advanced authorities; while applying for coding and decoding resources on the MCU for the multi-site video conference and allocate corresponding coding and decoding resources on the MCU to each of the video terminals having advanced authorities, wherein the allocated coding and decoding resources on the MCU can support display of picture information of all conference sites on the video terminals.

Alternatively, the management and control processing module may include:

an authority judging sub-module configured to, when receiving a request for a customized conference site picture sent by any video terminal, judge based on the configured identification information of the video terminals having the advanced authorities, whether the video terminal sending the request has an advanced authority, and if the video terminal sending the request has the advanced authority, acquire customization parameters from the video terminal, and if the video terminal sending the request has not the advanced authority, make no action; and a coding and decoding processing sub-module configured to combine based on the customization parameters acquired by the authority judging sub-module and coding and the decoding resources on the MCU allocated to the video terminal, a multi-picture so as to acquire customized conference site picture information, and send the customized conference site picture information to the video terminal for display.

Alternatively, in the case of the method for setting authority semi-dynamically, the MCU may further include:

an initial configuring module configured to, before the conference is started, configure, on the MCU, the number of video terminals having advanced authorities, while applying for coding and decoding resources on the MCU for the multi-site video conference and allocate a corresponding number of coding and decoding resources on the MCU based on the configured number of the video terminals having the advanced authorities, wherein the allocated coding and decoding resources on the MCU can support display of picture information of all conference sites on the video terminals having the advanced authorities.

Alternatively, the management and control processing module may include:

a resource judging sub-module configured to, when receiving a request for a customized conference site picture sent by any video terminal, judge whether the coding and decoding resources on the MCU allocated to the video terminals having the advanced authorities are used up, if the coding and decoding resources on the MCU allocated to the video terminals having the advanced authorities are used up; make no action; and if the coding and decoding resources on the MCU allocated to the video terminals having the advanced authorities are not used up, acquire customization parameters from the video terminal; and a coding and decoding processing sub-module configured to combine; based on the acquired customization parameters and remaining coding and decoding resources on the MCU, a multi-picture so as to acquire customized conference site picture information, and send the customized conference site picture information to the video terminal for display.

Alternatively, in the case of the method for setting authority dynamically, the MCU supports at least two multi-site video conferences, and the management and control processing module may specifically include:

a resource judging sub-module configured to, when receiving a request for a customized conference site picture sent by any video terminal, judge whether there are sufficient available coding and decoding resources on the MCU, if there are sufficient available coding and decoding resources on the MCU, acquire customization parameters from the video terminal, and if there are not sufficient available coding and decoding resources on the MCU, make no action;

a coding and decoding processing sub-module configured to combine, based on the customization parameters and the available coding and decoding resources on the MCU, a multi-picture so as to acquire customized conference site picture information, and send the customized conference site picture information to the video terminal for display.

Alternatively, the initial configuring module may be further configured to, before the conference is started, configure authentication information of a video terminal having an advanced authority on the MCU; and the resource judging sub-module may be further configured to, after it is identified based on the authentication information that the video terminal has the advanced authority, acquire customization parameters from the video terminal.

Alternatively, the MCU may further include an initial configuring module configured to, before the conference is started, configure authentication information of a video terminal having an advanced authority on the MCU; and accordingly, the resource judging sub-module may be further specifically configured to, after it is identified based on the authentication information that the video terminal has the advanced authority, acquire customization parameters from the video terminal.

In a third aspect, an embodiment of the disclosure further provides a system for implementing management and control of a multi-picture in a video conference, including: an MCU and video terminals located in conference sites, wherein the MCU is configured to send unified conference site picture information to each of video terminals of conference sites when a conference is initially started, and send corresponding customized conference site picture information to at least one of the video terminals according to a request for a customized conference site picture of the at least one of the video terminals during the conference; and the video terminals are configured to send, during the conference, a request for a customized conference site picture to the MCU as required, display, when the conference is initially started, the unified conference site picture information sent by the MCU, and display, during the conference, received customized conference site picture information.

In a fourth aspect, an embodiment of the disclosure further provides a method for managing and controlling a multi-picture in a video conference. An MCU supports a multi-site video conference, and in the method, a process executed by the MCU includes that:

when the conference is initially started, the MCU sends unified conference site picture information to each of video terminals of conference sites; and during the conference, the MCU sends corresponding customized conference site picture information to at least one of the video terminals according to a request for a customized conference site picture of at least one of the video terminals.

Alternatively, the at least one of the video terminals may be selected by:

selecting eligible video terminals from video terminals sending requests for customized conference site pictures as the selected at least one of the video terminals, through a method for setting authority statically, a method for setting authority semi-dynamically, or a method for setting authority dynamically.

Alternatively, in the case of the method for setting authority statically, the process executed by the MCU may further include that: before the conference is started, identification information of video terminals having advanced authorities is configured on the MCU, while coding and decoding resources on the MCU for the multi-site video conference are applied for and corresponding coding and decoding resources on the MCU are allocated to each of the video terminals having advanced authorities, wherein the allocated coding and decoding resources on the MCU can support display of picture information of all conference sites on the video terminals.

Alternatively, the process that during the conference, the MCU sends corresponding customized conference site picture information for display to the at least one of the video terminals according to the request for the customized conference site picture of at least one of the video terminals may specifically include that:

when receiving a request for a customized conference site picture sent by any video terminal, the MCU judges based on the configured identification information of the video terminals having the advanced authorities, whether the video terminal sending the request has an advanced authority, and if the video terminal sending the request has the advanced authority, acquires customization parameters from the video terminal, and if the video terminal sending the request has not the advanced authority, terminates the process; and the MCU combines, based on the acquired customization parameters and coding and decoding resources on the MCU allocated to the video terminal, a multi-picture so as to acquire customized conference site picture information, and sends the customized conference site picture information to the video terminal for display.

Alternatively, in the case of the method for setting authority semi-dynamically, the process executed by the MCU may further include that: before the conference is started, the number of video terminals having advanced authorities is configured on the MCU, while coding and decoding resources on the MCU for the multi-site video conference are applied for and a corresponding number of coding and decoding resources on the MCU are allocated based on the configured number of the video terminals having the advanced authorities, wherein the allocated coding and decoding resources on the MCU can support display of picture information of all conference sites on the video terminals having the advanced authorities.

Alternatively, the process that during the conference, the MCU sends the corresponding customized conference site picture information for display to the at least one of the video terminals according to the request for the customized conference site picture of the at least one of the video terminals may include that:

when receiving a request for a customized conference site picture sent by any video terminal, the MCU judges whether the coding and decoding resources on the MCU allocated to the video terminals having the advanced authorities are used up, if the coding and decoding resources on the MCU allocated to the video terminals having the advanced authorities are used up, terminates the process, and if the coding and decoding resources on the MCU allocated to the video terminals having the advanced authorities are not used up, acquires customization parameters from the video terminal; and the MCU combines based on the acquired customization parameters and remaining coding and decoding resources on the MCU, a multi-picture so as to acquire customized conference site picture information, and sends the customized conference site picture information to the video terminal for display.

Alternatively, in the case of the method for setting authority dynamically, the MCU supports at least two multi-site video conferences, and the process that during the conference, the MCU sends the corresponding customized conference site picture information for display to the at least one of the video terminals according to the request for the customized conference site picture of the at least one of the video terminals may include that:

when receiving a request for a customized conference site picture sent by any video terminal, the MCU judges whether there are sufficient available coding and decoding resources on the MCU, if there are sufficient available coding and decoding resources on the MCU, acquires customization parameters from the video terminal, and if there are not sufficient available coding and decoding resources on the MCU, terminates the process; and the MCU combines based on the customization parameters and the available coding and decoding resources on the MCU, a multi-picture so as to acquire customized conference site picture information, and sends the customized conference site picture information to the video terminal for display.

Alternatively, the process executed by the MCU may further include that: before the conference is started, authentication information of a video terminal having an advanced authority is configured on the MCU, and after it is identified based on the authentication information that the video terminal has the advanced authority, customization parameters are acquired from the video terminal.

In a fifth aspect, an embodiment of the disclosure further provides a method for managing and controlling a multi-picture in a video conference. The method may includes processes executed by a video terminal that:

when a conference is initially started, unified conference site picture information sent by an MCU is displayed;

during the conference, a request for a customized conference site picture is sent to the MCU as required; and received customized conference site picture information is displayed.

Alternatively, the process executed by the video terminal may further include that:

when the MCU acquires customization parameters from the video terminal, the customization parameters are sent to the MCU.

Alternatively, the process executed by the video terminal may further include that:

after the request for the customized conference site picture is sent to the MCU, authentication information of the video terminal is sent to the MCU, wherein the authentication information is used by the MCU to identify whether the video terminal has the advanced authority.

In a sixth aspect, an embodiment of the disclosure further provides a computer storage medium having stored therein computer-executable instructions for executing the method for managing and controlling a multi-picture in a video conference in the fourth aspect or the fifth aspect.

In a seventh aspect, an embodiment of the disclosure further provides a video terminal. The video terminal includes:

a requesting module configured to send a request for a customized conference site picture to an MCU;

a parameter customizing module configured to, when the MCU acquires customization parameters from the video terminal, send the customization parameters to the MCU; and a displaying module configured to display received customized conference site picture information.

By applying the technical solution above, the embodiments of the disclosure at least have the following advantages:

the method for managing and controlling a multi-picture in a video conference, the related device, and the storage medium provided by the embodiments of the disclosure, which enable conference sites having different authorities in the same conference to customize their own multi-picture contents to be viewed, are implemented based on ideas including purposeful allocation of resources; occupation of idle resources, authority management and so on, thus satisfying requirements of some conference sites on coding and decoding resources on the MCU, while saving total resources on the MCU, so as to improve the use efficiency of the coding and decoding resources on the MCU as a whole, and improve the competitiveness of a product.

DETAILED DESCRIPTION

For purpose of explaining the technical means adopted in the disclosure for achieving the preset object and the effect of the technical means, the disclosure will be described in detail hereinafter with reference to the accompanying drawings and preferred embodiments.

The first embodiment of the disclosure provides a method for managing and controlling a multi-picture in a video conference. An MCU supports a multi-site video conference which refers to the same video conference carried out in a plurality of conference sites, and a video terminal is located in each of the conference sites.

Figure 1:
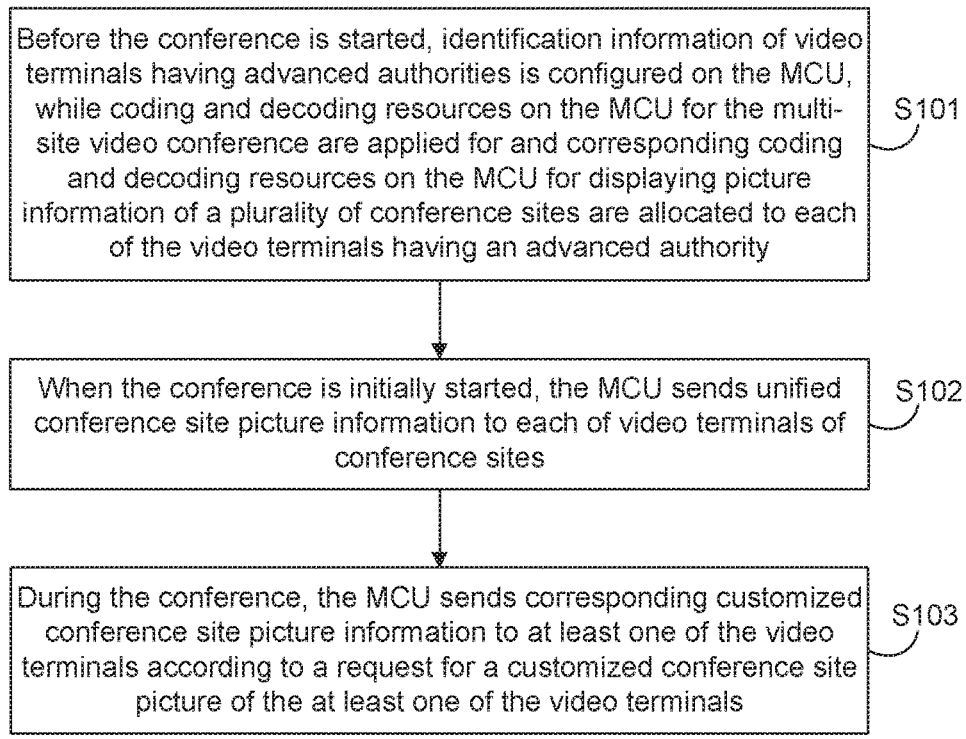
FIG. 1 is a flowchart of a process executed by an MCU in the case of static authority setting according to the first embodiment of the disclosure.

As shown in FIG. 1, in the method, in the case of static authority setting, a process executed by the MCU includes the following specific steps.

Step 101: before the conference is started, identification information of video terminals having advanced authorities is configured on the MCU, while coding and decoding resources on the MCU for the multi-site video conference are applied for, and corresponding coding and decoding resources on the MCU for displaying picture information of a plurality of conference sites are allocated to each of the video terminals having advanced authorities, wherein the allocated coding and decoding resources on the MCU can support display of picture information of all conference sites on the video terminals.

In the present step, since the coding and decoding resources on the MCU for the multi-site video conference are applied for, the coding and decoding resources on the MCU being applied for include the maximum number of coding and decoding resources on the MCU required by the video terminals having the advanced authorities, and coding and decoding resources on the MCU required when other video terminals display unified conference site picture information. The maximum number of coding and decoding resources on the MCU required by the video terminals having the advanced authorities refers to coding and decoding resources on the MCU required when display of picture information of all conference sites on the video terminals can be supported.

The identification information of the video terminals may be Identifiers (ID) of the video terminals, and a list of the video terminals having the advanced authorities may be formed by the IDs of the video terminals. The identification information of the video terminals may be passwords.

The coding and decoding resources on the MCU are quantified by various manufacturers on different basis without a fixed standard. However, a concept of a Continuous Presence (CP) is proposed in common, and the MCU resources are quantified by CPs. The CPs will be described from two perspectives.

1) From the perspective of a user, a CP is an MCU resource required by a video terminal to join a conference, including resources of picture coding and decoding, access and audio coding and decoding. However, an access resource and audio coding and decoding resources are not limited for the MCU at present, while picture coding and decoding resources are mainly limited; and coding and decoding resources on the MCU are mainly optimized in an embodiment of the disclosure.

2) From the perspective of a physical device, a single board of an MCU corresponds to several CPs; for example, a single board corresponds to 50 CPs, and 4 single boards are inserted into the MCU, then the MCU has 200=50×4 CPs in total; if 2 single boards are inserted into the MCU, then the MCU has only 100 CPs.

Step 102: when the conference is initially started, the MCU sends unified conference site picture information to each of video terminals of the conference sites.

Here, the video terminal of each of the conference sites receives the conference site picture information and displays the conference site picture information.

Step 103: during the conference, the MCU sends corresponding customized conference site picture information to at least one of the video terminals according to a request for a customized conference site picture of the at least one of the video terminals.

Here, the at least one of the video terminals receives the customized conference site picture information and displays the customized conference site picture information.

Specifically, Step 103 includes that:

when receiving a request for a customized conference site picture sent by any video terminal, the MCU judges, based on the configured identification information of the video terminals having the advanced authorities, whether the video terminal sending the request has an advanced authority, and if the video terminal sending the request has the advanced authority, acquires customization parameters from the video terminal, and if the video terminal sending the request has not the advanced authority, terminates the process; and the MCU combines, based on the acquired customization parameters and the coding and decoding resources on the MCU allocated to the video terminal, a multi-picture so as to acquire customized conference site picture information, and sends the customized conference site picture information to the video terminal for display. Here, the process of combining the multi-picture includes that: the MCU correspondingly decodes conference site picture information sent by various video terminals, and then codes and combines the same into the customized conference site picture information.

Figure 2:
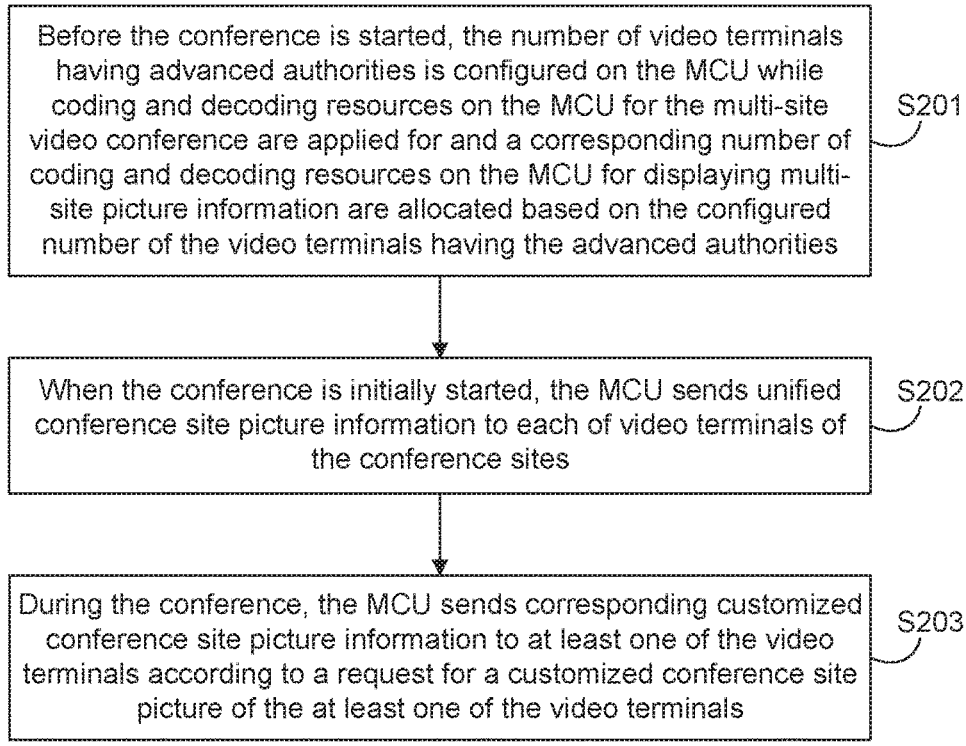
FIG. 2 is a flowchart of a process executed by an MCU in the case of semi-dynamic authority setting according to the first embodiment of the disclosure.

As shown in FIG. 2, in the method, a process executed by the MCU includes the following specific steps in the case of semi-dynamic authority setting.

Step 201: before the conference is started, the number of video terminals having advanced authorities is configured on the MCU while coding and decoding resources on the MCU for the multi-site video conference are applied for, and a corresponding number of coding and decoding resources on the MCU for displaying multi-site picture information are allocated based on the configured number of the video terminals having the advanced authorities.

Here, the allocated coding and decoding resources on the MCU can support display of picture information of all conference sites on the video terminals having the advanced authorities.

Alternatively. Step 201 further includes that: before the conference is started, authentication information of a video terminal having an advanced authority is configured on the MCU, and after it is identified based on the authentication information that the video terminal has the advanced authority, customization parameters are acquired from the video terminal. In the present embodiment, the authentication information includes: an authentication password, or identification information of the video terminal.

Step 202: when the conference is initially started, the MCU sends unified conference site picture information to each of video terminals of the conference sites.

Step 203: during the conference, the MCU sends corresponding customized conference site picture information to the at least one of the video terminals according to a request for a customized conference site picture of the at least one of the video terminals.

Specifically. Step 203 includes that:

when receiving a request for a customized conference site picture sent by any video terminal, the MCU judges whether the coding and decoding resources on the MCU allocated to the video terminals having the advanced authorities are used up, if the coding and decoding resources on the MCU allocated to the video terminals having the advanced authorities are used up, terminates the process, and if the coding and decoding resources on the MCU allocated to the video terminals having the advanced authorities are not used up, acquires customization parameters from the video terminal; and the MCU combines, based on the acquired customization parameters and remaining coding and decoding resources on the MCU, a multi-picture so as to acquire customized conference site picture information, and sends the customized conference site picture information to the video terminal for display.

Figure 3:
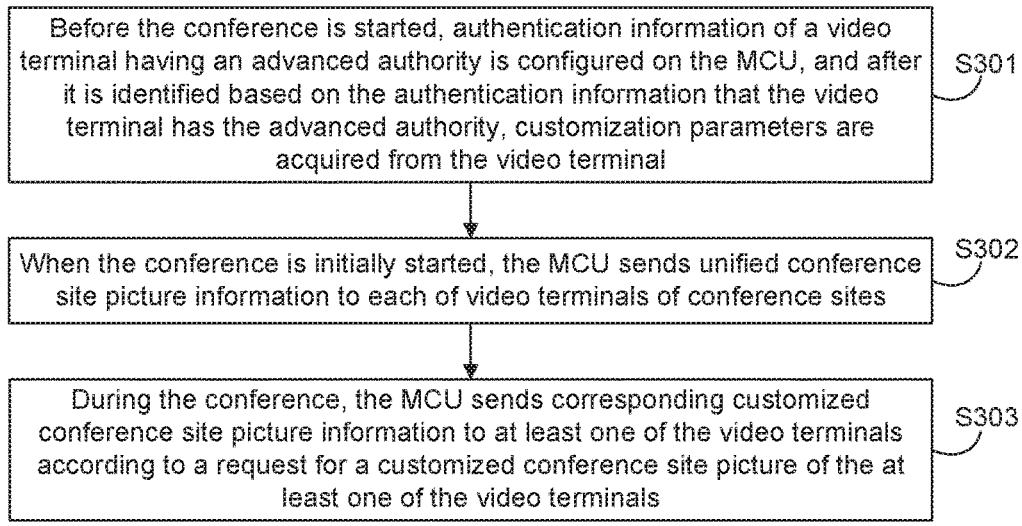
FIG. 3 is a flowchart of a process executed by an MCU in the case of dynamic authority setting according to the first embodiment of the disclosure.

As shown in FIG. 3, in the method, the MCU supports at least two multi-site video conferences in the case of dynamic authority setting, and a process executed by the MCU includes the following specific steps.

Step 301: before the conference is started, authentication information of a video terminal having an advanced authority is configured on the MCU, and after it is identified based on the authentication information that the video terminal has the advanced authority, customization parameters are acquired from the video terminal.

In the case of dynamic authority setting, before the conference is started, the MCU may apply for coding and decoding resources on the MCU for any multi-site video conference, and may also not apply for the coding and decoding resources on the MCU for any multi-site video conference.

Step 302: when the conference is initially started, the MCU sends unified conference site picture information to each of video terminals of the conference sites.

Step 303: during the conference, the MCU sends corresponding customized conference site picture information to at least one of the video terminals according to a request for a customized conference site picture of the at least one of the video terminals.

Specifically, Step 303 includes that:

when receiving a request for a customized conference site picture sent by any video terminal, the MCU judges whether there are sufficient available coding and decoding resources on the MCU, if there are sufficient available coding and decoding resources on the MCU, acquires customization parameters from the video terminal for which authentication is performed according to the authentication information, and if there are not sufficient available coding and decoding resources on the MCU, terminates the process; and the MCU combines based on the customization parameters and the available coding and decoding resources on the MCU, a multi-picture so as to acquire customized conference site picture information, and sends the customized conference site picture information to the video terminal for display.

Figure 4:
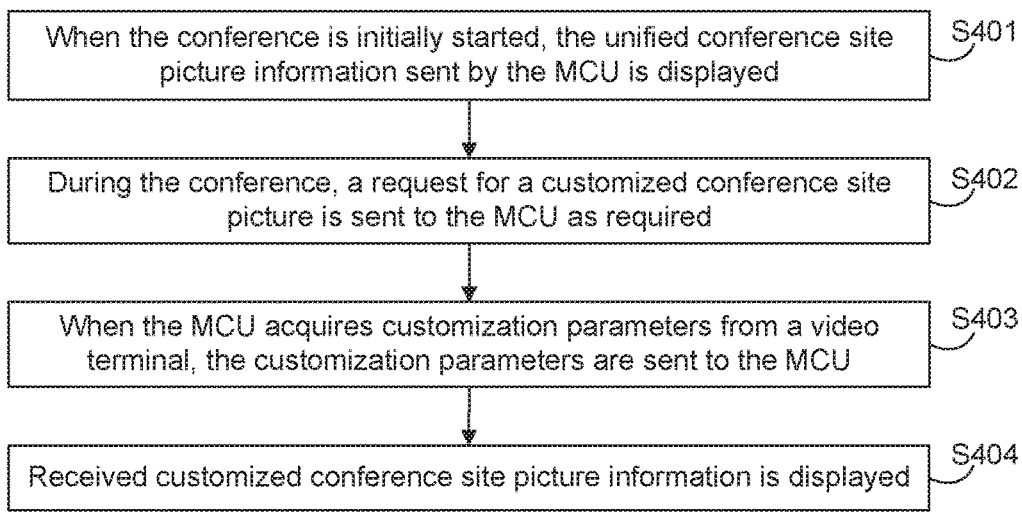
FIG. 4 is a flowchart of a process executed by a video terminal according to the first embodiment of the disclosure.

In the method of the present embodiment, as shown in FIG. 4, a process executed by a video terminal includes the following steps.

Step 401: when the conference is initially started, the unified conference site picture information sent by the MCU is displayed.

Step 402: during the conference, the video terminal sends a request for a customized conference site picture to the MCU as required.

Step 403: when the MCU acquires customization parameters from a video terminal, the video terminal sends the customization parameters to the MCU.

Here, the customization parameters include: the number and layouts of conference site pictures, and a video source of a selected conference site picture.

Step 404: the video terminal displays the received customized conference site picture information.

Two methods by which the MCU authenticates whether the video terminal has the advanced authority are introduced from the perspective of the video terminal below.

In the first method, the customized conference site picture request contains identification information of the video terminal, which is used by the MCU to judge whether the corresponding video terminal has an advanced authority.

In the second method, the process executed by the video terminal further includes that: after the video terminal sends the request for a customized conference site picture to the MCU, the video terminal sends authentication information of the video terminal to the MCU, wherein the authentication information is used by the MCU to identify whether the video terminal has the advanced authority.

The second embodiment of the disclosure provides an MCU for implementing management and control of a multi-picture in a video conference. The MCU supports a multi-site video conference which refers to the same video conference carried out in a plurality of conference sites.

Figure 5:
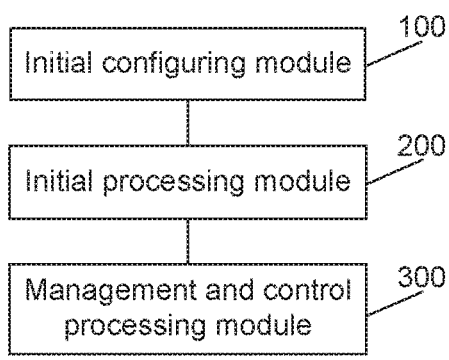
FIG. 5 is a schematic diagram of a structure of an MCU for implementing management and control of a multi-picture in a video conference according to the second embodiment of the disclosure.

As shown in FIG. 5, the MCU includes the following components: an initial configuring module 100, an initial processing module 200 and a management and control processing module 300.

1. In the case of static authority setting, functions executed by the functional modules in the MCU are as follows.

The initial configuring module 100 is configured to, before the conference is started, configure, on the MCU, identification information of video terminals having advanced authorities, such as IDs of the video terminals, and apply for coding and decoding resources on the MCU for the multi-site video conference and allocate corresponding coding and decoding resources on the MCU for displaying picture information of a plurality of conference sites to each of the video terminals having advanced authorities, wherein the allocated coding and decoding resources on the MCU can support display of picture information of all conference sites on the video terminals.

Specifically, since the coding and decoding resources on the MCU for the multi-site video conference are applied for, the coding and decoding resources on the MCU being applied for include the maximum number of coding and decoding resources on the MCU required by the video terminals having the advanced authorities, and coding and decoding resources on the MCU required when other video terminals display unified conference site picture information. The maximum number of coding and decoding resources on the MCU required by the video terminals having the advanced authorities refers to coding and decoding resources on the MCU required when display of picture information of all conference sites on the video terminals can be supported.

The initial processing module 200 is configured to send unified conference site picture information to each of video terminals of conference sites when the conference is initially started.

The management and control processing module 300 is configured to send corresponding customized conference site picture information to at least one of the video terminals according to a request for a customized conference site picture of the at least one of the video terminals during the conference.

Figure 6:
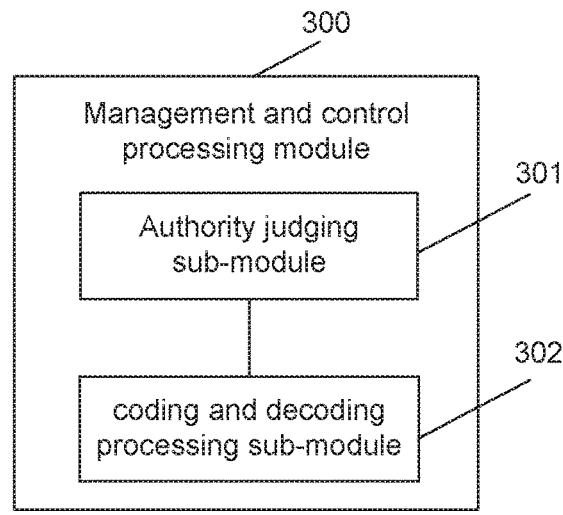
FIG. 6 is a schematic diagram of a specific structure of a control processing module in the case of static authority setting according to the second embodiment of the disclosure.

Specifically, FIG. 6 is a schematic diagram of a specific structure of a control processing module in the case of static authority setting. As shown in FIG. 6, the management and control module 300 includes:

an authority judging sub-module 301 configured to, when receiving a request for a customized conference site picture sent by any video terminal, judge based on the configured identification information of the video terminals having the advanced authorities, whether the video terminal sending the request has an advanced authority, and if the video terminal sending the request has the advanced authority, acquire customization parameters from the video terminal, and if the video terminal sending the request has not the advanced authority, make no action; and a coding and decoding processing sub-module 302 configured to combine based on the customization parameters acquired by the authority judging sub-module 301 and coding and decoding resources on the MCU allocated to the video terminal, a multi-picture so as to acquire customized conference site picture information, and send the customized conference site picture information to the video terminal for display. The process of combining the multi-picture includes that: the MCU correspondingly decodes conference site picture information sent by various video terminals, and then codes and combines the same into the customized conference site picture information.

2. In the case of semi-dynamic authority setting, functions executed by the functional modules in the MCU are as follows.

The initial configuring module 100 is configured to, before the conference is started, configure, on the MCU, the number of video terminals having advanced authorities, and apply for coding and decoding resources on the MCU for the multi-site video conference and allocate, based on the configured number of the video terminals having the advanced authorities, a corresponding number of coding and decoding resources on the MCU for displaying picture information of a plurality of conference sites, wherein the allocated coding and decoding resources on the MCU can support display of picture information of all conference sites on the video terminals having the advanced authorities.

The initial processing module 200 is configured to send unified conference site picture information to each of video terminals of conference sites when the conference is initially started.

Here, each of video terminals of conference sites receives the conference site picture information and displays the conference site picture information.

The management and control processing module 300 is configured to send corresponding customized conference site picture information to at least one of the video terminals according to a request for a customized conference site picture of the at least one of the video terminals during the conference.

Here, the at least one of the video terminals receives the customized conference site picture information and displays the customized conference site picture information.

Figure 7:
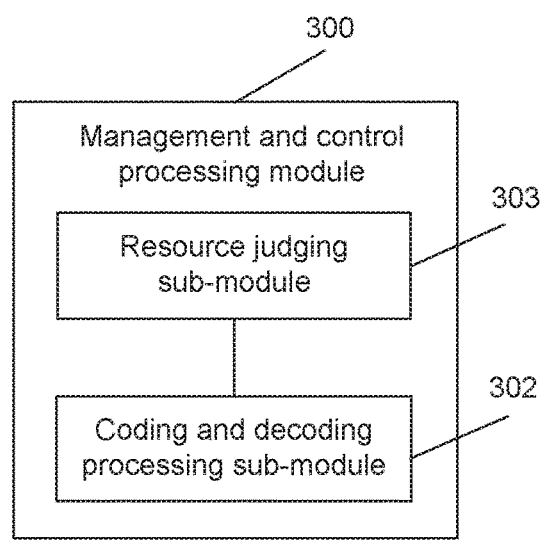
FIG. 7 is a schematic diagram of a specific structure of a control processing module in the case of semi-dynamic authority setting according to the second embodiment of the disclosure.

Specifically, FIG. 7 is a schematic diagram of a specific structure of a control processing module in the case of semi-dynamic authority setting. As shown in FIG. 7, the management and control processing module 300 specifically includes:

a resource judging sub-module 303 configured to, when receiving a request for a customized conference site picture sent by any video terminal, judge whether the coding and decoding resources on the MCU allocated to the video terminals having the advanced authorities are used up, if the coding and decoding resources on the MCU allocated to the video terminals having the advanced authorities are used up, make no action, and if the coding and decoding resources on the MCU allocated to the video terminals having the advanced authorities are not used up, acquire customization parameters from the video terminal; and a coding and decoding processing sub-module 302 configured to combine, based on the acquired customization parameters and remaining coding and decoding resources on the MCU, a multi-picture so as to acquire customized conference site picture information, and send the customized conference site picture information to the video terminal for display.

Alternatively, the initial configuring module 100 is further configured to, before the conference is started, configure authentication information of a video terminal having an advanced authority on the MCU. At the moment, the resource judging sub-module 303 is further specifically configured to, after it is identified based on the authentication information that the video terminal has the advanced authority, acquire customization parameters from the video terminal. The authentication information includes: an authentication password, or identification information of the video terminal.

3. In the case of dynamic authority setting, the MCU supports at least two multi-site video conferences, and functions executed by the functional modules in the MCU are as follows.

The initial configuring module 100 is configured to, before the conference is started, configure authentication information of a video terminal having an advanced authority on the MCU.

The initial processing module 200 is configured to send unified conference site picture information to each of video terminals of conference sites when the conference is initially started. Coding and decoding resources on the MCU for the multi-site video conferences supported by the MCU may be applied for, and may also not be applied for.

The management and control processing module 300 is configured to send corresponding customized conference site picture information to at least one of the video terminals for display according to a request for a customized conference site picture of the at least one of the video terminals during the conference.

Specifically, the management and control processing module 300 includes a resource judging sub-module 303 and a coding and decoding processing sub-module 302.

A resource judging sub-module 303 configured to, when receiving a request for a customized conference site picture sent by any video terminal, judge whether there are sufficient available coding and decoding resources on the MCU, if there are sufficient available coding and decoding resources on the MCU, acquire customization parameters from the video terminal, and if there are not sufficient available coding and decoding resources on the MCU, make no action. Alternatively, the resource judging sub-module 303 is further specifically configured to, after it is identified based on the authentication information that the video terminal has the advanced authority, acquire customization parameters from the video terminal.

A coding and decoding processing sub-module 302 configured to combine based on the customization parameters and the available coding and decoding resources on the MCU, a multi-picture so as to acquire customized conference site picture information, and send the customized conference site picture information to the video terminal for display. The customization parameters include: the number and layouts of conference site pictures, and a video source of a selected conference site picture.

Figure 8:
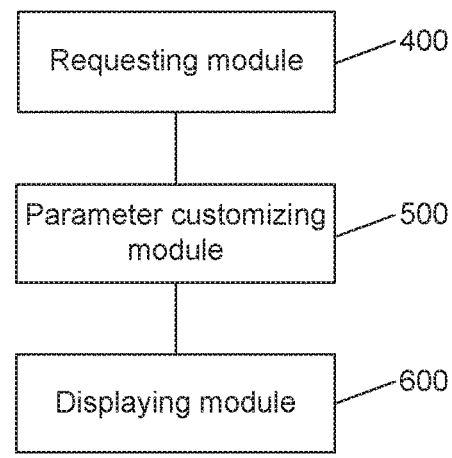
FIG. 8 is a schematic diagram of a structure of a video terminal for implementing management and control of a multi-picture in a video conference according to the third embodiment of the disclosure.

The third embodiment of the disclosure provides a video terminal for implementing management and control of a multi-picture in a video conference, wherein the video terminal is located in each conference site. As shown in FIG. 8, the video terminal includes a requesting module 400, a parameter customizing module 500 and a displaying module 600.

A requesting module 400 is configured to send a request for a customized conference site picture to an MCU;

A parameter customizing module 500 is configured to, when the MCU acquires customization parameters from the video terminal, send the customization parameters to the MCU, wherein the customization parameters include: the number and layouts of conference site pictures, and a video source of a selected conference site picture.

A displaying module 600 is configured to display received customized conference site picture information.

Two methods by which the MCU judges whether the video terminal has the advanced authority are introduced from the perspective of the video terminal below.

In the first method, the customized conference site picture request contains identification information of the video terminal; which is used by the MCU to judge whether the corresponding video terminal has an advanced authority.

In the second method, the requesting module 400 is further configured to, after the request for a customized conference site picture is sent to the MCU, send authentication information of the video terminal to the MCU, wherein the authentication information is used by the MCU to identify whether the video terminal has the advanced authority.

In the fourth embodiment of the disclosure, the present embodiment provides a system for implementing management and control of a multi-picture in a video conference based on the functions of the MCU and the video terminal recited in the first embodiment, and the system includes an MCU and video terminals located in conference sites.

In the system, the MCU is configured to send unified conference site picture information to each of video terminals of conference sites when a conference is initially started, and send corresponding customized conference site picture information for display to at least one of the video terminals according to a request for a customized conference site picture of the at least one of the video terminals during the conference.

In the system, the video terminals are configured to send, during the conference, a request for a customized conference site picture to the MCU as required, display, when the conference is initially started, the unified conference site picture information sent by the MCU, and display, during the conference, received customized conference site picture information.

Three application examples of the disclosure will be described respectively with reference to FIG. 9 to FIG. 11, in which authentication is performed by setting a password or a list of video terminals with high levels, and conference site control and authority application are performed by an Interactive Voice and Video Response (IVVR) process.

Figure 9:
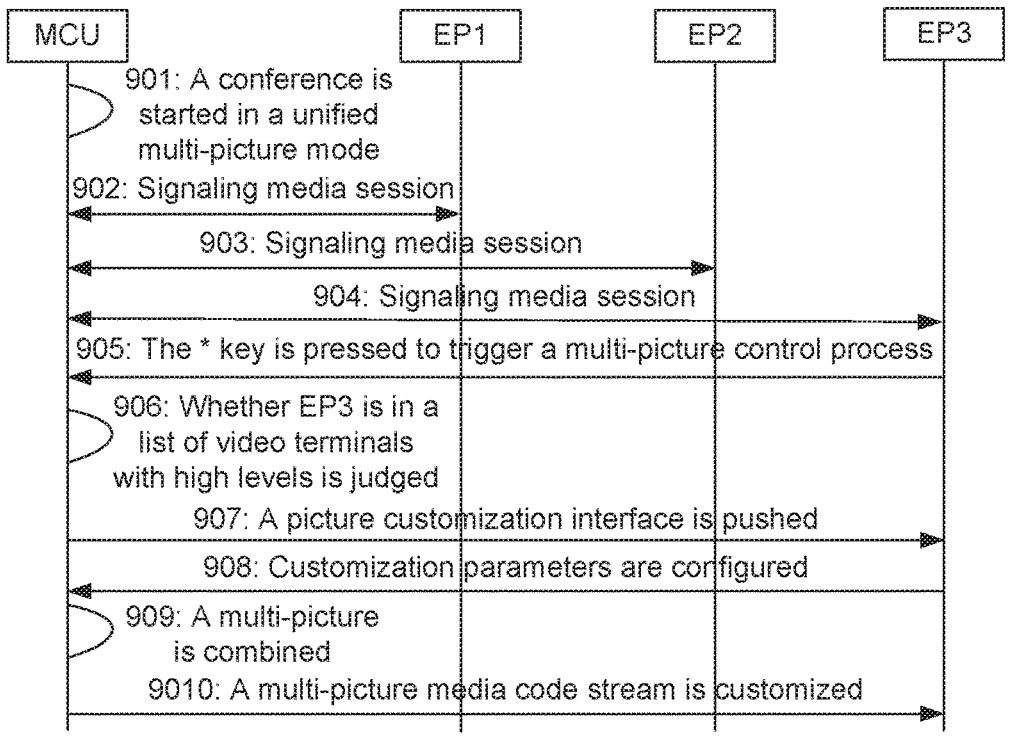
FIG. 9 is a flowchart of a process of managing and controlling a multi-picture of a video conference according to the first application example of the disclosure.

Application example 1: in the case of static authorities setting, as shown in FIG. 9, a process of managing and controlling a multi-picture in a video conference is as follows.

Step 901: a conference is started in a unified multi-picture mode.

Specifically, the conference is started in the unified multi-picture mode on an MCU. In the meanwhile, a list of video terminals having high levels is configured. Some coding and decoding resources on the MCU are applied for as required by the conference, and corresponding multi-picture resources are allocated to each of the video terminals. The multi-picture resources are coding and decoding resources on the MCU required when supporting display of picture information of all conference sites in the video conference in the video terminal.

Steps 902 to 904: the MCU calls video terminals EP1, EP2 and EP3 through signaling media sessions so as to start the conference.

Here, the video terminals EP1, EP2 and EP3 interact with the MCU through the signaling media sessions. Finally, the video terminals EP1, EP2 and EP3 join the same conference. In other words, the video terminals EP1, EP2 and EP3 are called to start the conference.

Step 905: the star key (*) is pressed to trigger a multi-picture control process.

Specifically, the video terminal EP3 triggers a multi-picture control IVVR process by using a shortcut key * customized by the system.

Step 906: the MCU judges whether the video terminal EP3 is in the list of the video terminals having the high levels.

Here, the MCU receives a request from the video terminal EP3, and judges whether the video terminal exists in the list of the video terminals having the high levels, if the video terminal exists in the list of the video terminals having the high levels, proceeds to Step 907, and if the video terminal doesn't exist in the list of the video terminals having the high levels, exits the process immediately.

Step 907: the MCU pushes a multi-picture customization operation interface to the video terminal EP3.

Step 908: the video terminal EP3 configures customization parameters and reports the same to the MCU.

Steps 909 to 910: a multi-picture is combined and a multi-picture media code stream is customized.

Here, the MCU receives the customization parameters, and combines the multi-picture according to the customization parameters and pre-allocated multi-picture resources so as to obtain customized conference site picture information, and pushes the customized conference site picture information to the video terminal EP3 for display, thereby customizing the multi-picture as required by the video terminal EP3.

Figure 10:
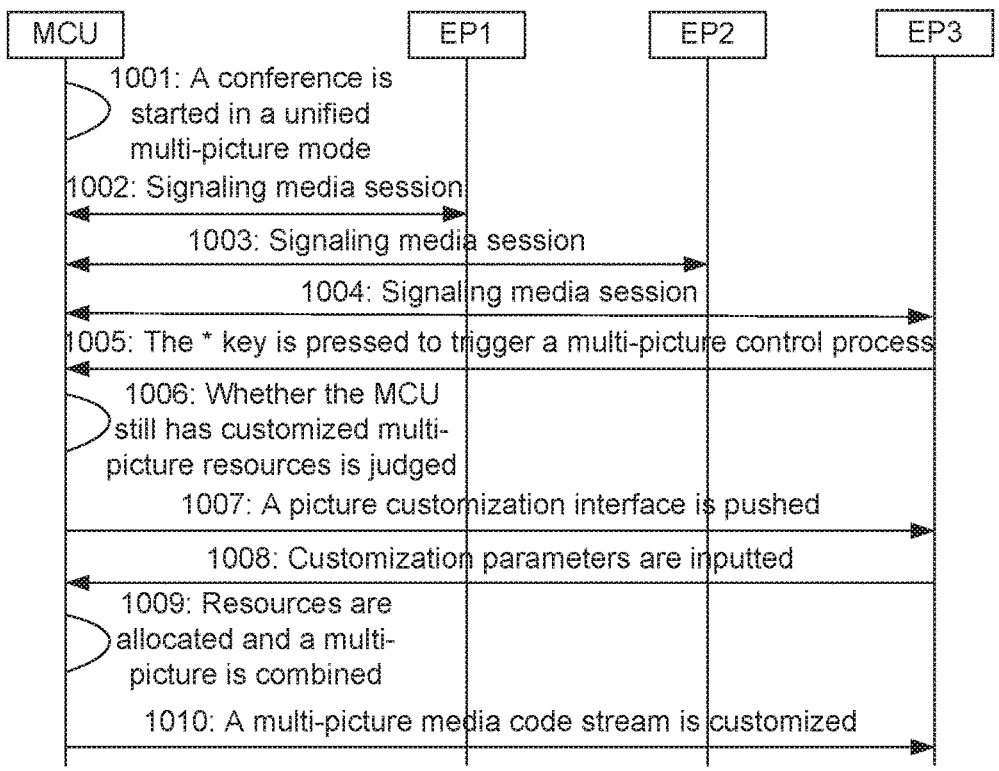
FIG. 10 is a flowchart of a process of managing and controlling a multi-picture of a video conference according to the second application example of the disclosure.
Figure 11:
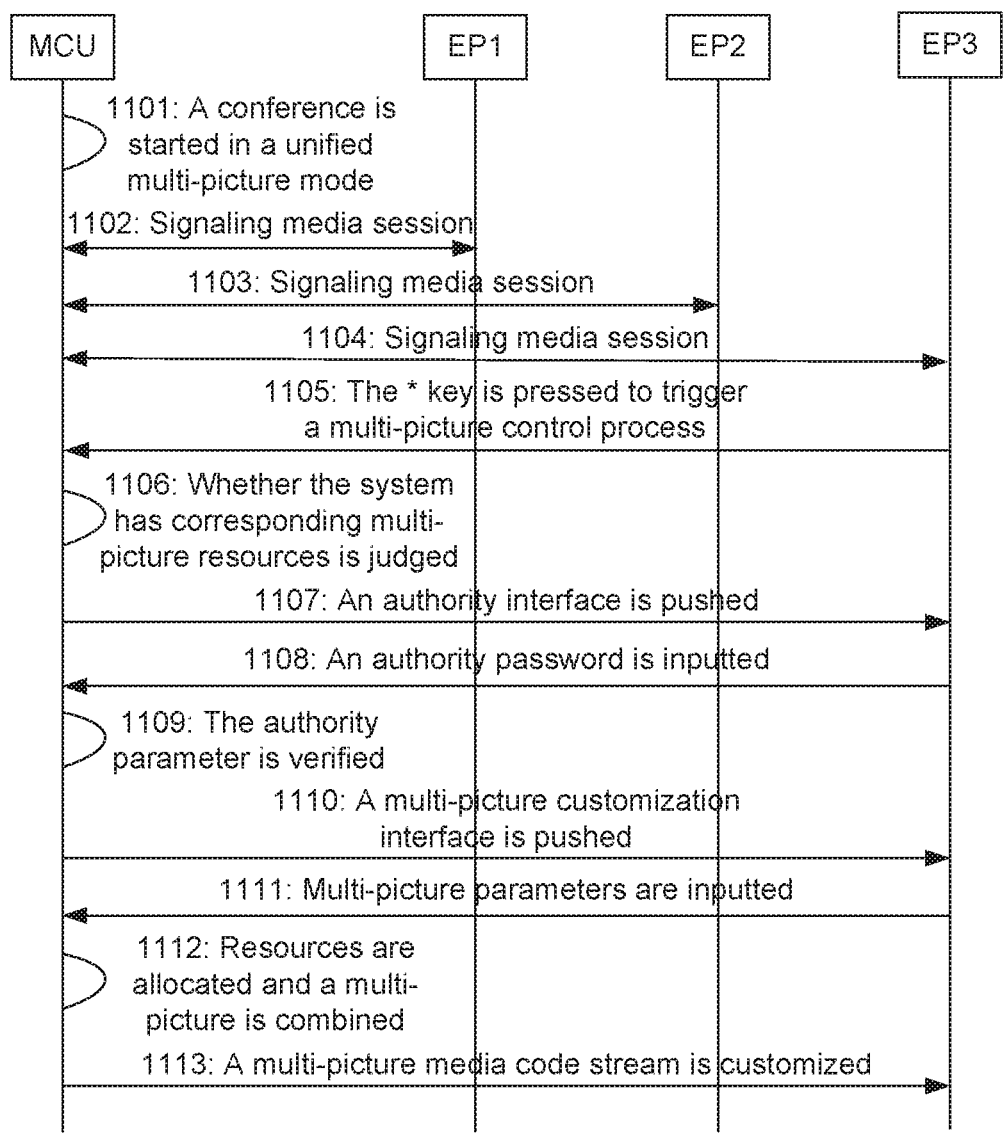
FIG. 11 is a flowchart of a process of managing and controlling a multi-picture of a video conference according to the third application example of the disclosure.

Application example 2: in the case of semi-dynamic authorities, as shown in FIG. 10, a process of managing and controlling a multi-picture in a video conference is as follows.

Step 1001: a conference is started in a unified multi-picture mode.

The conference is started in the unified multi-picture mode on an MCU. In the meanwhile, a number N of video terminals having high levels is configured on the MCU. Resources are applied for according to the capability of the conference while N multi-picture resources are allocated according to the number N of the video terminals having the high levels. These resources do not correspond to specific video terminals.

Steps 1002 to 1004: the MCU calls a video terminal EP1, EP2 and EP3 through signaling media sessions so as to start the conference. In other words, the video terminals EP1, EP2 and EP3 are called to start the conference.

Step 1005: the star key (*) is pressed to trigger a multi-picture control process.

Specifically, EP3 triggers a multi-picture control IVVR process by using a shortcut key * customized by the system.

Step 1006: whether the MCU still has customized multi-picture resources is judged.

Here, the MCU receives a request from the video terminal EP3, and judges whether the multi-picture resources for the video terminals of having the high levels in the current conference are used up, and if the multi-picture resources for the video terminals of having the high levels in the current conference are used up, exits the process immediately. If there are still sufficient unused multi-picture resources for the video terminals having the high levels, the process proceeds to Step 1007. An authority password, and a list of the video terminals having the high levels may be also set in the MCU, and when the MCU receives the request from the video terminal, the MCU performs verification according to the password or the list of the video terminals having the high levels.

Step 1007: the MCU pushes a multi-picture customization interface to EP3.

Step 1008: EP3 configures customization parameters and reports the same to the MCU.

Steps 1009 to 1010: resources are allocated, a multi-picture is combined and a multi-picture media code stream is customized.

Here, the MCU receives the customization parameters, combines the multi-picture according to the customization parameters and resources preserved in the conference, and pushes the pictures to the video terminal EP3, thereby customizing the multi-picture as required by the video terminal EP3.

Application example 3: in the case of dynamic authorities setting, an MCU supports two or more multi-site video conferences at the same time. In such case, each of video terminals of multi-site video conferences may forcibly occupy coding and decoding resources on the MCU across the conferences. As shown in FIG. 11, a process of managing and controlling a multi-picture in a video conference is as follows.

Step 1101: a conference is started in a unified multi-picture mode.

Specifically, the conference is started in the unified multi-picture mode on an MCU. Coding and decoding resources on the MCU may be applied for as required by each of the conferences, and may also not be applied for. Authority passwords of video terminals having advanced authorities are set for the conferences.

Steps 1102 to 1104: the MCU calls a video terminal EP1, EP2 and EP3 through signaling media sessions so as to start the conference. In other words, the video terminals EP1, EP2 and EP3 are called to start the conference.

Step 1105: the star key (is pressed to trigger a multi-picture control process.

Here, the video terminal EP3 triggers a multi-picture control IVVR process by using a shortcut key * customized by the system.

Step 1106: whether the MCU still has customized multi-picture resources is judged.

Here, the MCU judges whether there are still multi-picture resources in the current system, and if no, exits the process. Otherwise, the process proceeds to Step 1107.

Steps 1107 to 1108: The MCU pushes an authentication interface to the video terminal EP3. The video terminal EP3 inputs an authority password as prompted by the interface. The MCU verifies authority parameters, and may further perform the verification by setting a list of video terminals having high levels.

Steps 1110 to 1111: if an authority is verified successfully, the MCU pushes a multi-picture control interface thereof. The video EP3 inputs multi-picture customization parameters. If the authority is verified unsuccessfully, the process is exited immediately.

Steps 1112 to 1113: resources are allocated, a multi-picture is combined and a multi-picture media code stream is customized.

Here, the MCU receives the multi-picture customization parameters, terminates the IVVR process, and allocates resources, decodes code streams for the video terminals EP1 and EP2, and combines, according to a designated layout, pictures required by a user. The MCU pushes a picture acquired through the combination to the video terminal EP3.

The solutions of the three application examples are compared with each other as follows: the solution of the first application example is simple to implement and can be implemented rapidly, and improves the utilization ratio of coding and decoding resources on the MCU. However, the utilization ratio of the resources of the solution of the first application example is relatively low compared with the other two solutions, and the solution of the first application example is more suitable for an administrative conference with a relatively fixed conference scenario. The third application example has the highest utilization ratio of resources, but has high requirements on a usage method and scheduling of resources within an MCU, is more suitable for a conference with free discussion. The second application example is implemented with moderate difficulty, and may be also implemented rapidly, and the utilization ratio of MCU resources is between the utilization ratios of the first application example and the third application example, and the second application example may be suitable for various scenarios.

An authority of a conference site is applied for and a conference is operated and controlled in various ways, for example, through performing, by a video terminal, interactive acknowledgement with an MCU through an Interactive Voice Response (IVR) process and an IVVR process, through a third party interface of an MCU and other user-defined signalings thereof, or through methods including a director control software or a chairman extension signaling of a 323 process and so on, and the invention is not limited to the embodiment of the disclosure.

The embodiments of the disclosure implement a function of freely selecting and viewing a multi-picture in various conference sites on the premise of saving resources, and improve the use efficiency of coding and decoding resources on the MCU by three methods applied to respective application scenarios.

An initial processing module, the management and control processing module and the initial configuring module in the MCU provided by the embodiments of the disclosure, and the resource judging sub-module, the authority judging sub-module and the coding and decoding processing sub-module in the management and control processing module may be implemented by a processor in the MCU. The requesting module, the parameter customizing module and the displaying module in the video terminal provided by the embodiments of the disclosure may be implemented by a processor in the video terminal. Functions completed by the processors may be also implemented by a specific logical circuit. During a process of a specific embodiment, the processor may be a Central Processing Unit (CPU), a Microprocessor Unit (MPU), a Digital Signal Processor (DSP) or a Field-Programmable Gate Array (FPGA).

In the embodiments of the disclosure, the method for managing and controlling a multi-picture in a video conference may be also stored in a computer readable storage medium when implemented in a form of a software functional module, and sold or used as an independent product. Based on such understanding, the essential part or a part contributing to traditional art of the technical solutions of the embodiments of the disclosure may be embodied in a form of a software product. The computer software product is stored in storage media and includes several instructions for allowing a computer device (such as a personal computer, a server, a network device, or the like) to execute all or part of the methods in various embodiments of the disclosure. The storage media include various medium that can store program codes, such as a Universal Serial Bus (USB) disk, a mobile hard disk, a Read-Only Memory (ROM), a magnetic disc, an optical disk, or the like. Thus, the embodiments of the disclosure are not limited to any specific combination of hardware and software.

Accordingly, an embodiment of the disclosure further provides a computer storage medium. The computer storage medium stores computer executable instructions for executing the methods for managing and controlling a multi-picture in a video conference, which are applied to an MCU or a video terminal, according to the embodiments of the disclosure.

By describing a specific embodiment, the technical means applied by the disclosure to achieve the preset purpose and the effect of the technical means may be understood more deeply and specifically. However, the appended drawings are only used for providing references and description, but are not used for limiting the disclosure.

INDUSTRIAL APPLICABILITY

In an embodiment of the disclosure, a process executed by an MCU includes that; when the conference is initially started, the MCU sends unified conference site picture information to each of video terminals of conference sites; and during the conference, the MCU sends corresponding customized conference site picture information to at least one of the video terminals according to a request for a customized conference site picture of the at least one of the video terminals. In this way, the technical solution provided by the embodiment of the disclosure can satisfy requirements of some conference sites on coding and decoding resources on the MCU, while saving total resources on the MCU, so as to integrally improve the use efficiency of the coding and decoding resources on the MCU, and improve the competitiveness of a product.

What is claimed is:

1. A method for managing and controlling a multi-picture in a video conference, comprising:
   when the conference is initially started, sending, by a Multi Control Unit (MCU), unified conference site picture information to each of video terminals of conference sites; and
   during the conference, sending, by the MCU, a corresponding customized conference site picture information to at least one of the video terminals according to a request for a customized conference site picture of the at least one of the video terminals,
   wherein
   the at least one of the video terminals is selected by selecting, through a method for setting authority statically, eligible video terminals from video terminals sending the requests for the customized conference site picture as the selected at least one of the video terminals, in the case of the method for setting authority statically, the process executed by the MCU further comprises: before the conference is started, configuring, on the MCU, identification information of video terminals having advanced authorities, while applying for coding and decoding resources on the MCU for the multi-site video conference and allocating corresponding coding and decoding resources on the MCU to each of the video terminals having advanced authorities, wherein the allocated coding and decoding resources on the MCU can support display of picture information of all conference sites on the video terminals,
   the at least one of the video terminals is selected by selecting, through a method for setting authority semi-dynamically, eligible video terminals from video terminals sending the requests for the customized conference site picture as the selected at least one of the video terminals, and in the case of the method for setting authority semi-dynamically, the process executed by the MCU further comprises: before the conference is started, configuring, on the MCU, the number of video terminals having advanced authorities, while applying for coding and decoding resources on the MCU for the multi-site video conference and allocating a corresponding number of coding and decoding resources on the MCU based on the configured number of the video terminals having the advanced authorities, wherein the allocated coding and decoding resources on the MCU can support display of picture information of all conference sites on the video terminals having the advanced authorities, or
   the at least one of the video terminals is selected by selecting, through a method for setting authority dynamically, eligible video terminals from video terminals sending the requests for the customized conference site picture as the selected at least one of the video terminals, and in the case of the method for setting authority dynamically, the MCU supports at least two multi-site video conferences, and during the conference, sending, by the MCU, the corresponding customized conference site picture information for display to the at least one of the video terminals according to the request for the customized conference site picture of the at least one of the video terminals comprises: when receiving a request for a customized conference site picture sent by any video terminal, judging, by the MCU, whether there are sufficient available coding and decoding resources on the MCU, if there are sufficient available coding and decoding resources on the MCU, acquiring customization parameters from the video terminal, and if there are not sufficient available coding and decoding resources on the MCU, terminating the process; and combining, by the MCU, based on the customization parameters and the available coding and decoding resources on the MCU, a multi-picture so as to acquire customized conference site picture information, and sending the customized conference site picture information to the video terminal for display.

2. The method for managing and controlling a multi-picture in a video conference according to claim 1, wherein during the conference, sending, by the MCU, the corresponding customized conference site picture information for display to the at least one of the video terminals according to the request for the customized conference site picture of the at least one of the video terminals specifically comprises:
when receiving a request for a customized conference site picture sent by any video terminal, judging, by the MCU, based on the configured identification information of the video terminals having the advanced authorities, whether the video terminal sending the request has an advanced authority, and if the video terminal sending the request has the advanced authority, acquiring customization parameters from the video terminal, and if the video terminal sending the request has not the advanced authority, terminating the process; and
combining, by the MCU, based on the acquired customization parameters and the coding and decoding resources on the MCU allocated to the video terminal, a multi-picture so as to acquire customized conference site picture information, and sending the customized conference site picture information to the video terminal for display.

3. The method for managing and controlling a multi-picture in a video conference according to claim 1, wherein during the conference, sending, by the MCU, the corresponding customized conference site picture information for display to the at least one of the video terminals according to the request for the customized conference site picture of the at least one of the video terminals comprises:
when receiving a request for a customized conference site picture sent by any video terminal, judging, by the MCU, whether the coding and decoding resources on the MCU allocated to the video terminals having the advanced authorities are used up, if the coding and decoding resources on the MCU allocated to the video terminals having the advanced authorities are used up, terminating the process, and if the coding and decoding resources on the MCU allocated to the video terminals having the advanced authorities are not used up, acquiring customization parameters from the video terminal; and combining, by the MCU, based on the acquired customization parameters and remaining coding and decoding resources on the MCU, a multi-picture so as to acquire customized conference site picture information, and sending the customized conference site picture information to the video terminal for display.

4. The method for managing and controlling a multi-picture in a video conference according to claim 1, wherein the process executed by the MCU further comprises:
before the conference is started, configuring, on the MCU, authentication information of a video terminal having an advanced authority, wherein the authentication information is used by the MCU to identify whether the video terminal has the advanced authority; and
after it is identified based on the authentication information that the video terminal has the advanced authority, acquiring, by the MCU, customization parameters from the video terminal.

5. The method for managing and controlling a multi-picture in a video conference according to claim 1, comprising processes, executed by a video terminal, of:
when the conference is initially started, displaying the unified conference site picture information sent by the MCU;
during the conference, sending the request for the customized conference site picture to the MCU as required; and
displaying received customized conference site picture information.

6. The method for managing and controlling a multi-picture in a video conference according to claim 5, wherein the process executed by the video terminal further comprises:
sending the customization parameters to the MCU, when the MCU acquires customization parameters from the video terminal.

7. The method for managing and controlling a multi-picture in a video conference according to claim 2, wherein the customization parameters comprise: the number and layouts of conference site pictures, and a video source of a selected conference site picture.

8. The method for managing and controlling a multi-picture in a video conference according to claim 5, wherein the request for the customized conference site picture contains identification information of the video terminal, and the identification information is used by the MCU to judge whether the corresponding video terminal has an advanced authority.

9. The method for managing and controlling a multi-picture in a video conference according to claim 5, wherein the process executed by the video terminal further comprises:
sending authentication information of the video terminal to the MCU, after the request for the customized conference site picture is sent to the MCU, wherein the authentication information is used by the MCU to identify whether the video terminal has the advanced authority.

10. A Multi Control Unit (MCU) for implementing management and control of a multi-picture in a video conference, the MCU supporting a multi-site video conference and comprising:
a memory storing executable instructions; and
a processor configured to be capable of executing the stored executable instructions to perform steps of:

sending, when the conference is initially started, unified conference site picture information to each of video terminals of conference sites; and sending, during the conference, corresponding customized conference site picture information to at least one of the video terminals according to a request for a customized conference site picture of the at least one of the video terminals, wherein the at least one of the video terminals is selected by selecting, through a method for setting authority statically, eligible video terminals from video terminals sending the requests for the customized conference site picture as the selected at least one of the video terminals, in the case of the method for setting authority statically, the MCU is further configured to: before the conference is started, configure, on the MCU, identification information of video terminals having advanced authorities, while apply for coding and decoding resources on the MCU for the multi-site video conference and allocating corresponding coding and decoding resources on the MCU to each of the video terminals having advanced authorities, wherein the allocated coding and decoding resources on the MCU can support display of picture information of all conference sites on the video terminals, the at least one of the video terminals is selected by selecting, through a method for setting authority semi-dynamically, eligible video terminals from video terminals sending the requests for the customized conference site picture as the selected at least one of the video terminals, and in the case of the method for setting authority semi-dynamically, the MCU is further configured to: before the conference is started, configure, on the MCU, the number of video terminals having advanced authorities, while apply for coding and decoding resources on the MCU for the multi-site video conference and allocating a corresponding number of coding and decoding resources on the MCU based on the configured number of the video terminals having the advanced authorities, wherein the allocated coding and decoding resources on the MCU can support display of picture information of all conference sites on the video terminals having the advanced authorities, or the at least one of the video terminals is selected by selecting, through a method for setting authority dynamically, eligible video terminals from video terminals sending the requests for the customized conference site picture as the selected at least one of the video terminals, and in the case of the method for setting authority dynamically, the MCU is configured to support at least two multi-site video conferences, and the MCU is further configured to: when receiving a request for a customized conference site picture sent by any video terminal, judge, by the MCU, whether there are sufficient available coding and decoding resources on the MCU, if there are sufficient available coding and decoding resources on the MCU, acquire customization parameters from the video terminal, and if there are not sufficient available coding and decoding resources on the MCU, terminate the process; and combine based on the customization parameters and the available coding and decoding resources on the MCU, a multi-picture so as to acquire customized conference site picture information, and send the customized conference site picture information to the video terminal for display.

11. A non-transitory computer storage medium having stored therein computer-executable instructions for executing the method for managing and controlling a multi-picture in a video conference according to claim 1.

* * * * *